E. F. NORELIUS.
TRACTOR.
APPLICATION FILED FEB. 24, 1914.

1,184,705.

Patented May 23, 1916.
2 SHEETS—SHEET 2.

Witnesses:

Inventor
Emil F. Norelius
by Parker & Carter
his Attys

UNITED STATES PATENT OFFICE.

EMIL F. NORELIUS, OF PEORIA, ILLINOIS, ASSIGNOR TO HOLT MANUFACTURING COMPANY, OF PEORIA, ILLINOIS, A CORPORATION OF CALIFORNIA.

TRACTOR.

1,184,705.  Specification of Letters Patent. Patented May 23, 1916.

Application filed February 24, 1914. Serial No. 820,504.

*To all whom it may concern:*

Be it known that I, EMIL F. NORELIUS, a citizen of the United States, residing at Peoria, in the county of Peoria and State of Illinois, have invented a certain new and useful Improvement in Tractors, of which the following is a specification.

This invention relates to improvements in tractors and more particularly to that type employing an endless self-laying traction member, by which the vehicle is driven.

Among the objects of the invention is the provision of a traction member which is free to yield vertically throughout practically its entire extent and thus conform substantially to the contour of the ground over which the tractor passes, and at the same time is laterally stiff and rigid to prevent diverging of the tractor from its course.

A further object of the invention is to combine in the smallest possible unit, a maximum of traction power, utilizing traction members of the self-laying variety in a minimum of unit space The invention obviates all idle supporting surfaces, which are necessary in ordinary construction, and when the usual type of steering mechanism is employed, and controls the movement of the tractor directly from and by the traction members.

A full understanding of the invention will be attained from the following detailed description, taken in connection with the accompanying drawings, illustrating a structural embodiment of the same in a preferred form, and specifically pointed out in the claims.

Figure 1:
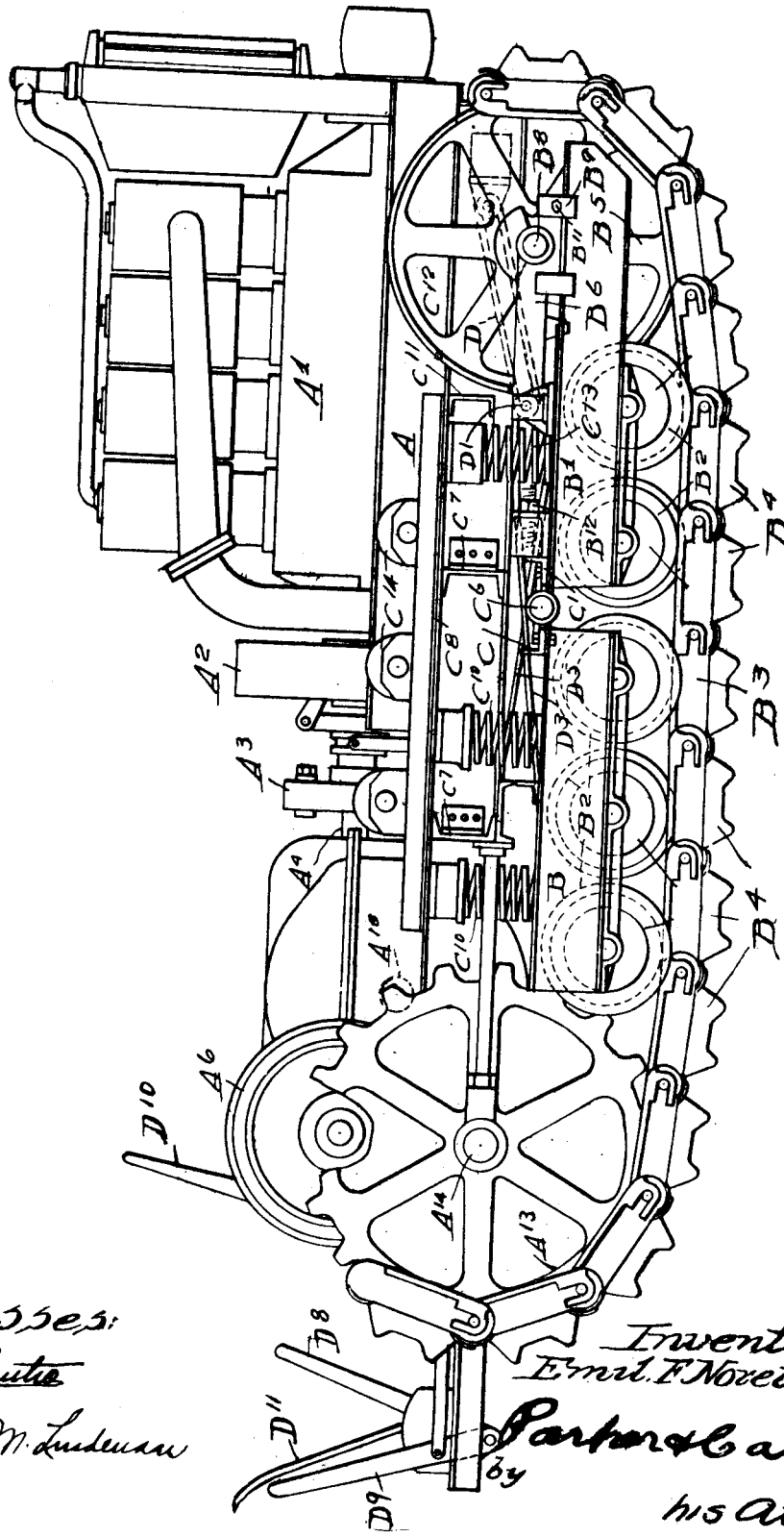
Figure 2:
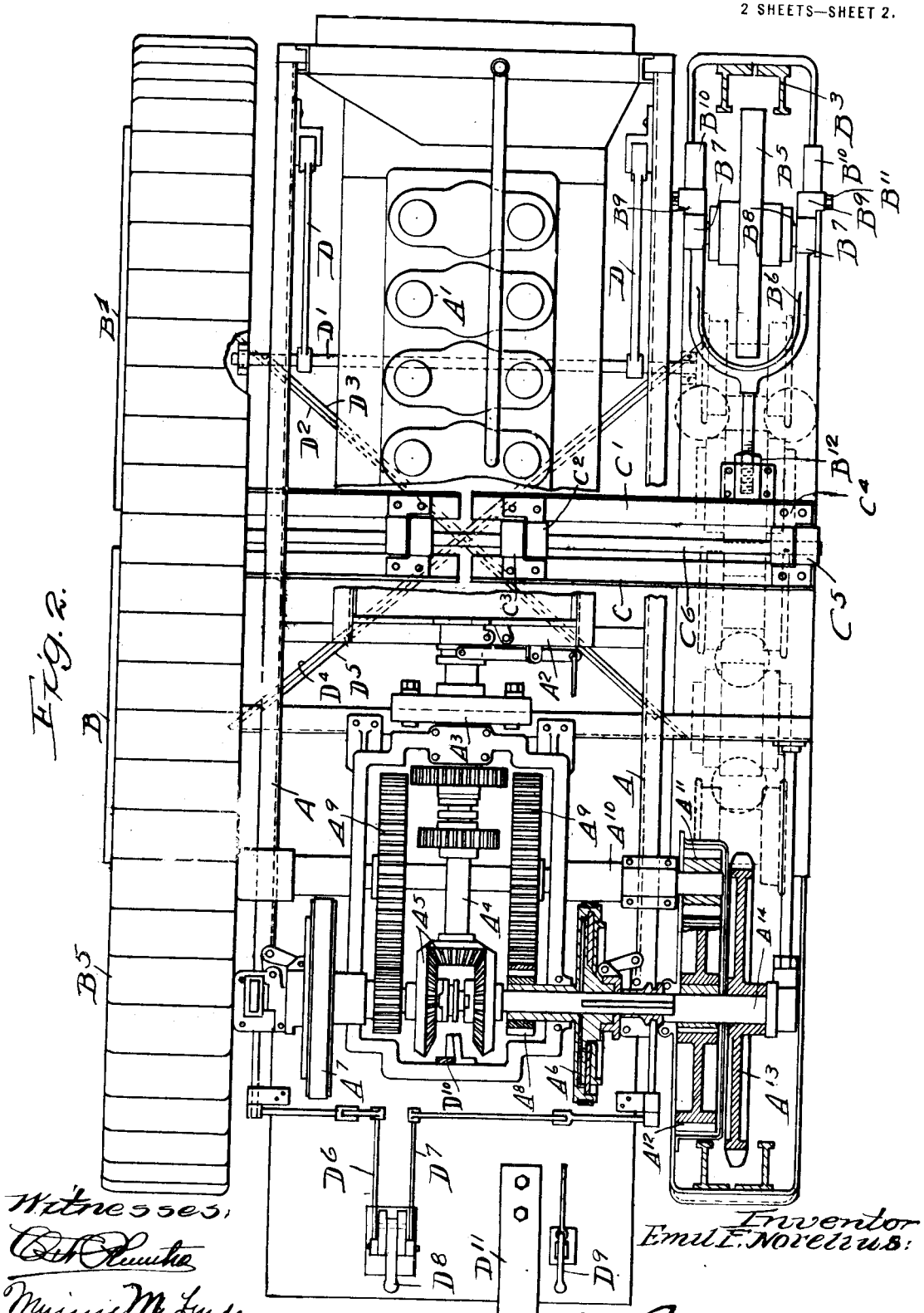

Referring to the drawings,—Figure 1 is a side elevation of the improved tractor; and Fig. 2 is a plan.

In the drawings, wherein like characters of reference designate similar parts throughout the several views, the main frame of the machine is designated at $A$ upon which is mounted a prime mover $A^1$ driving, through a clutch $A^2$, universal joint $A^3$, gear shaft $A^4$ and reverse mechanism $A^5$, the clutch brakes $A^6$ and $A^7$. These clutch brakes are adapted to drive the pinions $A^8$ which mesh with gears $A^9$, the gears $A^9$ in turn driving suitable shafts $A^{10}$, and with the shafts the pinions $A^{11}$ meshing with the large gears $A^{12}$ which drive the axles $A^{14}$ of the sprockets $A^{13}$.

The sprockets $A^{13}$ are adapted to drive an endless self-laying traction member $B^3$ comprising in the preferred form a plurality of articulated links, each link of which is equipped with a grouser plate $B^4$. Mounted within the traction member is a truck consisting of a plurality of independent sections, preferably two, $B$ and $B^1$, each truck section being provided with a plurality of rollers $B^2$ engaging the track belt and adapted to run thereon. By reference to Fig. 1 it will be noted that one of the truck sections, for instance, the section $B$, is provided with a greater number of rollers than the other section $B^1$, the section $B$ being shown as having three rollers and the section $B^1$ having two rollers. The traction member $B^3$ passes around idler sprockets $B^5$ revolubly mounted on a shaft $B^8$ on the truck section $B^1$. Longitudinal adjustment of the sprockets $B^5$ is effected by means of a yoke $B^6$ on which is mounted at one end the shaft bearings $B^7$, said yoke having a threaded connection with the truck section $B^1$, so that it may be shifted longitudinally in either direction by screwing on the nut $B^{12}$. The yoke is provided with guides $B^9$ which slide along the frame members $B^{10}$ and are adapted to lock the yoke and with it the sprocket mounted thereon in adjusted position by means of clamps $B^{11}$.

Rigidly mounted on the adjacent opposed ends of the truck section frames are angle bars $C^1$. These angle bars extend inwardly toward the center of the tractor beneath the main frame, and are flush with the outer sides of the truck frames. At or near each end the angles are provided with hinge members $C^2$ and $C^3$, and $C^4$ and $C^5$, these hinge members being pivotally mounted on a shaft $C^6$ extending clear across beneath the main frame, and independent thereof. Mounted in this way each section of the truck frame is free to rock about the shaft $C^6$ in substantially a vertical plane without interference from the other truck section. It will be noted that the truck sections as yieldingly mounted will permit the traction member to yield vertically throughout practically its entire extent, and thus conform substantially to the contour of the ground over which the tractor passes. In this way the equilibrium of the tractor is not seriously disturbed by rough or uneven ground. To minimize the jar of the traction member and prevent transmission of an undue amount of vibration to the main frame resilient cushioning devices are interposed between the truck sections and the main frame of the vehicle. Overhanging the truck sections at either side are a number of channel beams $C^7$, $C^{11}$, which extend transversely beneath the main frame of the vehicle and are supported by the angle bar $C^{12}$ running longitudinally with the vehicle. This angle bar forms a saddle $C^8$ for the springs $C^{10}$ mounted on the truck B and the springs $C^{13}$ on the truck $B^1$. In this way the combined action of the springs yieldingly supports the load of the vehicle on the truck sections B and $B^1$. For supporting the upward run of the traction member $B^3$ a number of idler rollers $C^{14}$ are suitably mounted on the main frame A of the vehicle.

Pivoted at one end on the main frame and at the other at $D^1$ mounted in suitable bearings carried by the truck sections $B^1$ and extending transversely beneath the main frame are links D which serve to prevent longitudinal displacement of the flexible traction members with respect to the main frame. These links coöperate with the pivot shaft $C^6$ in maintaining the truck sections upright and at the same time allowing each truck section to have a free oscillating movement in a vertical plane independent of every other truck section. Further bracing the trucks against lateral or longitudinal movement, without interference with their free vertical oscillating movement is provided by the diagonal brace rods $D^2$, $D^3$, $D^4$, $D^5$, each of which has one end fastened to the main frame and the other to one of the sections of the roller frames. These four rods all cross each other at a point approximately below the center of the pivot rod $C^6$ and tend to prevent sidewise warping or endwise movement of the truck sections, and at the same time, do not interfere at all with the vertical yielding movement of the individual truck sections and portions of the track on which they run. The steering of the tractor is effected by manipulating one or the other of the clutch brakes $A^6$ to disconnect the driving connections to the respective track member; the driving connection to the other traction member remaining intact so that the engine turns on that side to which the brake has been applied. A manipulation of the brakes is accomplished from the operator's seat indicated at $D^{11}$ by the selective lever $D^8$ which controls the connections $D^6$, $D^7$. Speed control for the engine is indicated by the lever $D^9$ and the reverse by the lever $D^{10}$.

It will be noted that the entire weight of the machine is supported upon two endless flexible traction members whose bearing length is approximately equal to the total length of the machine, and that, in order to render such a construction practicable under working conditions, it is necessary to divide the roller truck into two sections and so connect these sections that they will coöperate and maintain their alinement and still give the necessary yielding support for the load.

By thus supporting the entire load on the two traction members it is possible to effect steering through the traction members. This is done by suitably manipulating the selective lever so that if it is desired to turn to the right, the lever is operated to apply the right-hand brake, whereupon, through its clutch mechanism, the drive connections to the right-hand traction member is disconnected or retarded; the left-hand traction member still continuing to travel forward at normal speed and turn the machine to that side on which less power is applied. To turn to the left the operation is reversed. Such a construction permits the entire obviation of steering wheels, thus materially reducing the number of parts and consequently rendering it much more compact than has been hitherto attained in vehicles of like character.

It is manifest that various changes in form, proportions and minor details of construction may be resorted to within the scope of the appended claims and that I do not wish to limit myself to the specific design and construction here shown.

What I claim is:

1. In a vehicle, the combination of a main frame and an endless, flexible, self-laying traction member, comprising a two-part roller truck, a sprocket thereon, a sprocket on the main frame, a track chain riding over said sprockets and supporting the truck, the two parts of the roller truck being pivotally connected along a line, at right angles to their longitudinal axis, and a yielding connection between each of the truck parts and the main frame.

2. A tractor comprising a main frame, an endless, flexible, self-laying traction member on either side thereof having each a two-part roller truck, and a connecting shaft upon which each of said truck parts is pivoted extending across beneath the main frame to join the two trucks together, the front and rear parts of said trucks being tied together in pairs beneath the main frame.

3. A tractor having an endless, flexible, self-laying traction member mounted on either side, said traction member including a plurality of separate roller truck parts, said parts being pivoted together, a pivotal shaft upon which said parts are pivoted extending across beneath the main frame to tie the corresponding parts of the opposed traction members together, and additional means extending across beneath the main frame to tie said parts together.

4. In a vehicle, the combination of a main frame, an endless flexible self-laying traction member, and a laterally rigid truck including a plurality of separate sections supported within the traction member, and having a free oscillating movement in substantially vertical planes about a transverse axis, independent of the vehicle frame.

5. In a vehicle, the combination with the main frame, of an endless flexible self-laying traction member, and a laterally rigid vertically flexible truck supported within the traction member and comprising a plurality of separate sections, the several sections constituting the truck being pivotally connected together independently of the frame.

6. In a vehicle, the combination of a main frame, a supporting member for the main frame including an endless flexible self-laying traction member and a laterally rigid, vertically flexible truck mounted within the traction member, said truck comprising two articulated sections, each of which is adapted to yield in substantially vertical planes about a common axis independent of the vehicle frame.

7. In a vehicle, the combination of a main frame, a supporting member for the main frame including an endless flexible self-laying traction member, a vertically flexible truck mounted within the traction member, said truck comprising two articulated sections, each of which is adapted to yield in substantially vertical planes about a common axis independent of the vehicle frame, and means for maintaining the truck sections substantially rigid against lateral movement with respect to the frame.

8. In a vehicle, the combination with the main frame, of an endless, flexible, self-laying traction member, a truck supported within the traction member comprising a plurality of independent sections each adapted to have a free, oscillating, yielding movement in substantially vertical planes independent of the main frame, and yielding connections between the truck sections and the main frame.

9. In a vehicle, the combination with a frame, of a pair of self-laying tracks adapted to support the entire weight of the vehicle and its frame, trucks interposed between the frame and the traction members, each truck comprising a plurality of articulated sections, and yielding connections crosswise between the trucks to permit each truck section to yield independently of the other.

10. In a vehicle, the combination with a frame, of a pair of self-laying tracks adapted to support the entire weight of the vehicle and its frame, trucks interposed between the frame and the traction members, each truck comprising a plurality of articulated sections, yielding connections crosswise between the trucks to permit each truck section to yield independently of the other, and cushioning means interposed between the truck sections and the frame.

11. In a vehicle, the combination with a frame, of a pair of self-laying tracks adapted to support the entire weight of the vehicle and its frame, trucks interposed between the frame and the traction members, each truck comprising a plurality of articulated sections, yielding connections crosswise between the trucks to permit each truck section to yield independently of the other, and means for steering the vehicle by varying the speed of one self-laying traction member with respect to the other.

12. In a vehicle, the combination with a frame, of a pair of self-laying tracks adapted to support the entire weight of the vehicle and its frame, trucks interposed between the frame and the traction members, each truck comprising a plurality of articulated sections, yielding connections crosswise between the trucks to permit each truck section to yield independently of the other, cushioning means interposed between the truck sections and the frame, and means for steering the vehicle by varying the speed of one self-laying traction member with respect to the other.

13. In a traction engine, the combination of a main frame, an engine carried thereby, a pair of flexible, endless, self-laying traction members extending approximately the entire length of the frame and supporting the entire load, drive connections between the engine and said traction members, articulated trucks within the traction members and traveling on the ground run thereof, means for supporting the load yieldably on the trucks to permit each truck section to have a limited yielding motion independent of the others, connections between the articulations of one truck and the articulations of the opposite truck, and means for steering the machine acting through the drive connections between the engine and the traction members.

14. The combination with a vehicle frame, of a driving member therefor embodying an endless, flexible, self-laying track, a drive sprocket mounted on the frame around which the track travels, an articulated truck within the endless, flexible, self-laying track, said truck member composed of articulated sections, each of which sections has springs interposed between it and the frame to support the latter, and a front idler adjustably mounted on the foremost of said articulated sections and around which idler the track travels, with means for maintaining the articulated truck sections in operative position under working conditions between said sprocket and said idler.

15. The combination with a main frame, of a pair of endless-flexible traction members on opposite sides thereof, articulated trucks within the traction members, a shaft disconnected from the main frame connecting the trucks at their points of articulation so that each truck section has a free, limited, oscillating, vertical motion, and springs interposed between the frame and the truck sections and supporting the load thereon.

16. The combination with a main frame, of a pair of endless-flexible traction members on opposite sides thereof, articulated trucks within the traction members, a shaft disconnected from the main frame connecting the trucks at their points of articulation so that each truck section has a free limited oscillating vertical motion, and springs interposed between the frame and the truck sections and supporting the load thereon, each truck section having an inwardly projecting arm or bracket member extending parallel with the shaft with the inner ends of the bracket members hingedly connected to the shaft.

17. The combination with a vehicle frame, of a pair of endless, flexible traction members arranged on opposite sides thereof, trucks within the traction members yieldingly supporting the load, each truck composed of two alined articulated sections, and a shaft extending transversely of the frame and forming the articulations for both trucks, and about which shaft each section has a limited vertical rocking movement.

In testimony whereof, I affix my signature in the presence of two witnesses this 18th day of February 1914.

EMIL F. NORELIUS.

Witnesses:
 WILLIAM TURNBULL,
 C. C. BAKER.